Oct. 11, 1932.  J. A. MAYNARD  1,881,808
RELIEF DEVICE
Filed Dec. 26, 1931
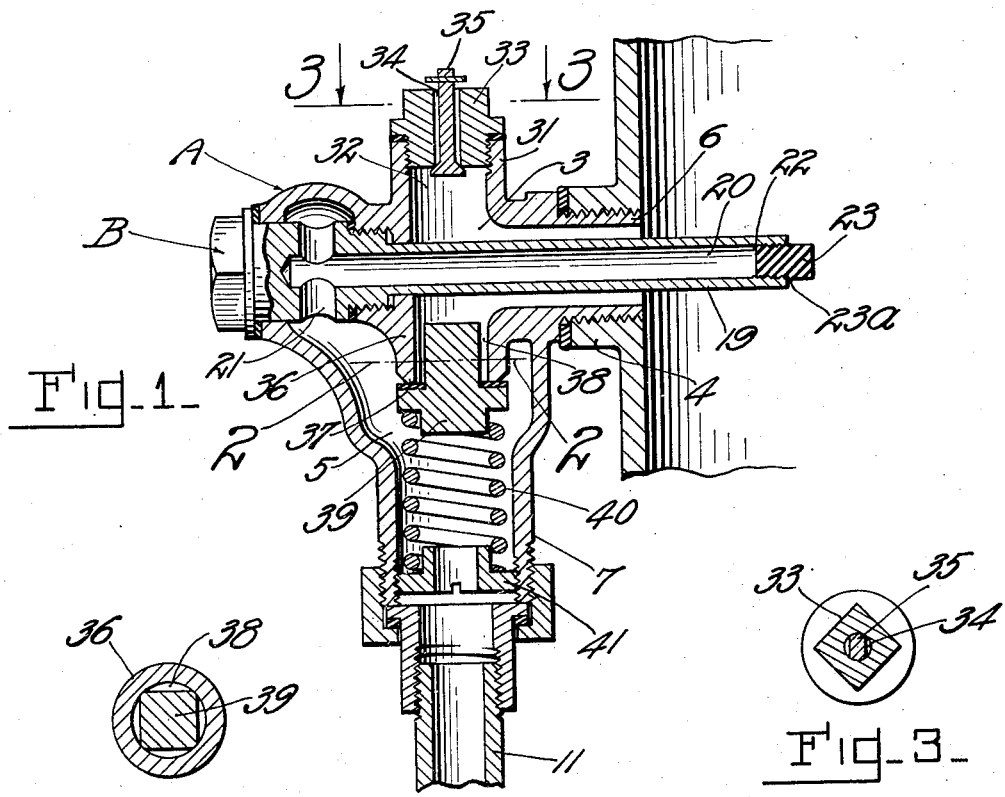
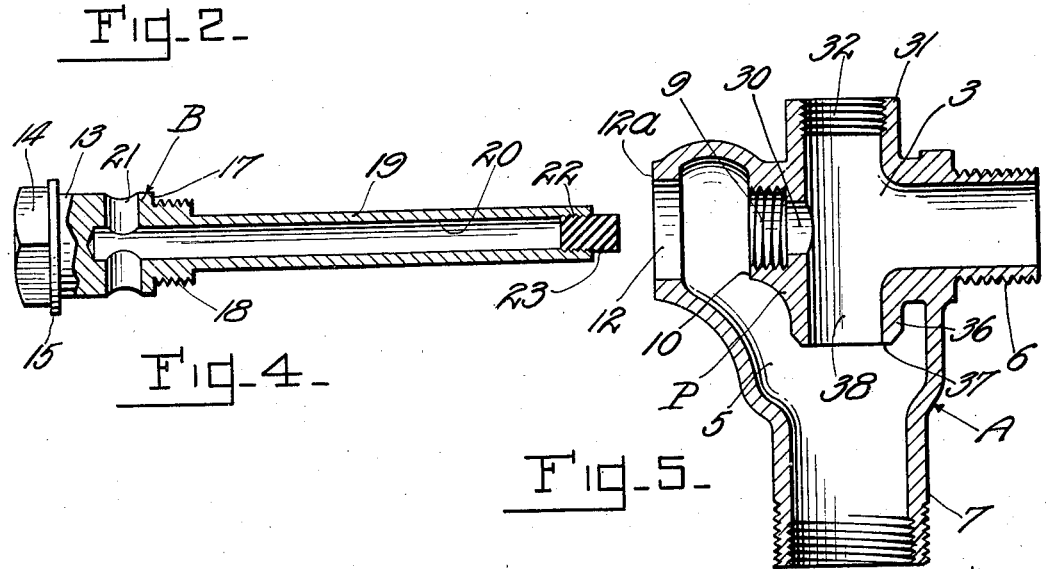
INVENTOR:
Joseph A. Maynard
by Macleod, Calver, Copeland & Dike
Attys.

Patented Oct. 11, 1932

1,881,808

UNITED STATES PATENT OFFICE

JOSEPH A. MAYNARD, OF BOSTON, MASSACHUSETTS

RELIEF DEVICE

Application filed December 26, 1931. Serial No. 583,327.

The present invention relates to relief devices especially adapted for use in hot water systems, such as hot water boilers.

In my prior Patent No. 1,814,722, dated July 14, 1931, a temperature relief device is described which is constructed in such manner as to permit the temperature relief member or fusible element to be readily and easily replaced without dismantling the device and which is simple in construction and inexpensive to manufacture.

It is an object of the present invention to provide an improved relief device embodying the principles underlying the invention described in my above mentioned patent and adapted to include temperature relief means together with either or both pressure and vacuum relief means and which is constructed so that the pressure or vacuum relief means will in no way interfere or minimize the advantages of my prior invention.

The above and other objects of the invention will be more clearly understood from the following description in conjunction with the accompanying drawing: in which, Fig. 1 is a fragmentary sectional elevational view illustrating the device attached to a boiler;

Figs. 2 and 3 are sectional views taken upon the lines 2—2 and 3—3 of Fig. 1;

Fig. 4 is a view illustrating one of the removable parts of the device; and

Fig. 5 is a sectional elevational view of the device with the removable parts omitted.

Before explaining in detail the present invention, it is to be understood that the invention is not limited in its application to the details of construction and arrangement of parts illustrated in the accompanying drawings, since the invention is capable of other embodiments and of being practised or carried out in various ways. Also it is to be understood that the phraseology or terminology employed herein is for the purpose of description and not of limitation, and it is not intended to limit the invention beyond the terms of the several claims hereto appended as considered in view of the prior art and the requirements thereof.

The relief device herein shown for the purpose of illustrating the present preferred form of the invention comprises a casing A having one side wall thereof provided with an extension 6 forming the inlet branch and also provided at right angles thereto with an outlet branch 7. The inlet branch 6 is exteriorly threaded to permit the device to be screwed into the boss 4 of a boiler and the outlet branch 7 is exteriorly threaded so that a suitable drain pipe 11 may be connected thereto. The wall of the casing A opposite the inlet branch 6 is formed with a circular opening 12 having a flat circular face 12a surrounding the opening. A partition P is formed within the casing A and separates an inlet chamber 3 and an outlet chamber 5. An opening 30 is provided in the partition P in alinement with the opening 12 and the inlet branch 6. The opening 30 is counterbored and tapped at 9 for the attachment of the removable valve member B. The side wall of the partition P adjacent the opening 30 is machined to provide a shoulder 10 adjacent the tapped portion 9.

The removable valve member B is of stepped formation comprising a cylindrical body portion 13 enlarged to form a wrench receiving head 14 providing a shoulder 15 adapted to abut the face 12a around the edge of the opening 12, a gasket being interposed between the parts, and the body 13 fitting snugly in the opening 12. The body 13 extends through the chamber 5 and is machined to provide a shoulder 17 abutting the shoulder 10, a gasket being interposed therebetween. The valve member B also has a threaded portion 18 which screws into the tapped portion 9 of the opening 30 and permits the removable member B to be adjusted into proper position in the casing. The valve member B is also formed with a tubular extension 19 of smaller diameter which extends through the inlet branch 6 to provide a passage therebetween and which, preferably, extends beyond the end of the inlet branch into the boiler. This tubular portion 19 as well as the body portion 13 have a common axial passage 20 which terminates at its rear end at a point opposite the chamber 5, a communicating passage 21 being drilled at right angles thereto and opening into the chamber 5. The outer end of the tube 19 is tapped at 22 to receive a threaded fusible plug or element 23. This fusible plug is formed of suitable metal capable of fusing at a predetermined desired temperature, such as 212° F., and the metal of this plug is formed with the exterior threads 23a permitting the plug to be threaded or screwed directly into the tapped end of the tube 19.

A portion of the casing A enclosing the inlet chamber 3 is provided with an extension 31 having a passage 32 which is tapped to receive a plug 33 having a passage 34 normally closed by a vacuum valve 35 engaging a seat surrounding the inner end of the passage. The partition P is provided with an annular projection 36 extending toward the outlet branch 7. The annular extension 36 is provided with a passage 38 providing communication between the inlet chamber 3 and outlet chamber 5 and which is normally closed by a pressure valve 39 held against the seat 37 at the outer end of the extension 36 by a spring 40 extending between the same and an apertured plug 41 threaded in the tapped end of the outlet branch 7.

I claim:

1. A relief device comprising a hollow casing having an exteriorly threaded extension forming an inlet branch and adapted to be secured to a boiler, said casing having an outlet branch at right angles to said extension, said inlet and outlet branches being separated by a partition providing an inlet chamber and an outlet chamber, said casing and partition each having an opening opposite said inlet branch, a one piece-removable member insertable axially through said openings and inlet branch and secured in one of said openings, said member having means for closing the other of said openings and having communicating ducts at right angles to each other connecting the inlet end of said removable member with the outlet chamber, and a fusible plug closing one of said ducts.

2. A relief device comprising a hollow casing having an exteriorly threaded extension forming an inlet branch and adapted to be secured to a boiler, said casing having an outlet branch at right angles to said extension, said inlet and outlet branches being separated by a partition providing an inlet chamber and an outlet chamber, said casing and partition each having an opening opposite said inlet branch, a one piece removable member insertable axially through said openings and inlet branch and secured in one of said openings, said member having means for closing the other of said openings and having communicating ducts at right angles to each other connecting the inlet end of said removable member with the outlet chamber, a fusible plug closing one of said ducts, said casing having an opening communicating with said inlet chamber, and a valve normally closing said last mentioned opening and adapted to open when the pressure in said inlet chamber is less than atmospheric.

3. A relief device comprising a hollow casing having an exteriorly threaded extension forming an inlet branch and adapted to be secured to a boiler, said casing having an outlet branch at right angles to said extension, said inlet and outlet branches being separated by a partition providing an inlet chamber and an outlet chamber, said casing and partition each having an opening opposite said inlet branch, a one piece removable member insertable axially through said openings and inlet branch and secured in one of said openings, said member having means for closing the other of said openings and having communicating ducts at right angles to each other connecting the inlet end of said removable member with the outlet chamber, a fusible plug closing one of said ducts, said partition having an opening providing communication between said inlet and outlet chambers, and a valve normally closing said opening and adapted to open in said outlet chamber when the pressure in said inlet chamber reaches a predetermined amount.

4. A relief device comprising a hollow casing having an exteriorly threaded extension forming an inlet branch and adapted to be secured to a boiler, said casing having an outlet branch at right angles to said extension, said inlet and outlet branches being separated by a partition providing an inlet chamber and an outlet chamber, said casing and partition each having an opening opposite said inlet branch, a one piece removable member insertable axially through said openings and inlet branch and secured in one of said openings, said member having means for closing the other of said openings and having communicating ducts at rights angles to each other connecting the inlet end of said removable member with the outlet chamber, a fusible plug closing one of said ducts, said casing having an opening communicating with said inlet chamber, a valve normally closing said last mentioned opening and adapted to open when the pressure in said inlet chamber is less than atmospheric, said partition having an opening providing communication between said inlet and outlet chambers, and a valve normally closing said opening and adapted to open in said outlet chamber when the pressure in said inlet chamber reaches a predetermined amount.

5. A relief device comprising a hollow casing having an exteriorly threaded extension forming an inlet branch and adapted to be secured to a boiler, said casing having an outlet branch at right angles to said extension, said inlet and outlet branches being separated by a partition providing an inlet chamber and an outlet chamber, said casing and partition each having an opening opposite said inlet branch, a one piece removable member insertable axially through said openings and inlet branch and secured in one of said openings, said member having means for closing the other of said openings and having communicating ducts at right angles to each other connecting the inlet end of said removable member with the outlet chamber, a fusible plug closing one of said ducts, said partition having an annular portion extending toward said outlet branch and having an opening providing communication between said inlet and outlet chambers, and a valve resiliently seated against the end of said annular portion and normally closing the opening therein.

In testimony whereof I affix my signature.

JOSEPH A. MAYNARD.